(12) United States Patent
Hussein et al.

(10) Patent No.: US 8,957,167 B2
(45) Date of Patent: Feb. 17, 2015

(54) POLYMERIZATION PROCESS USING A SUPPORTED CONSTRAINED GEOMETRY CATALYST

(75) Inventors: F. David Hussein, Cross Lanes, WV (US); Kevin J. Cann, Rocky Hill, NJ (US); F. Gregory Stakem, Flemington, NJ (US); Ann M. Schoeb-Wolters, Lebanon, NJ (US); Wesley R. Mariott, Sealy, TX (US); James M. Farley, League City, TX (US); Michael D. Awe, Langhorne, PA (US)

(73) Assignee: Univation Technologies, LLC, Houston, TX (US)

( * ) Notice: Subject to any disclaimer, the term of this patent is extended or adjusted under 35 U.S.C. 154(b) by 46 days.

(21) Appl. No.: 13/376,669

(22) PCT Filed: Jul. 27, 2010

(86) PCT No.: PCT/US2010/043365
§ 371 (c)(1),
(2), (4) Date: Feb. 2, 2012

(87) PCT Pub. No.: WO2011/017092
PCT Pub. Date: Feb. 10, 2011

(65) Prior Publication Data
US 2012/0130032 A1 May 24, 2012

Related U.S. Application Data

(60) Provisional application No. 61/229,158, filed on Jul. 28, 2009.

(51) Int. Cl.
| | | |
|---|---|---|
| *C08F 4/649* | (2006.01) | |
| *C08F 4/642* | (2006.01) | |
| *C08F 4/6592* | (2006.01) | |
| *C08F 10/00* | (2006.01) | |
| *C08F 210/16* | (2006.01) | |
| *C08F 4/659* | (2006.01) | |

(52) U.S. Cl.
CPC ............. *C08F 10/00* (2013.01); *C08F 210/16* (2013.01); *C08F 4/65916* (2013.01); *C08F 4/6592* (2013.01); *C08F 2410/01* (2013.01); *C08F 2410/02* (2013.01); *Y10S 526/943* (2013.01)
USPC ............. 526/74; 526/133; 526/134; 526/143; 526/147; 526/160; 526/348; 526/943; 502/103; 502/152; 502/155

(58) Field of Classification Search
CPC ...... C08F 2/34; C08F 4/65908; C08F 4/6592; C08F 2420/00; C08F 10/00; C08F 4/649; C08F 4/65912
USPC ........... 526/74, 133, 134, 143, 147, 160, 943; 502/103, 152, 155
See application file for complete search history.

(56) References Cited

U.S. PATENT DOCUMENTS

| | | | |
|---|---|---|---|
| 4,532,311 A | 7/1985 | Fulks et al. | |
| 4,543,399 A | 9/1985 | Jenkins, III et al. | |
| 4,588,790 A | 5/1986 | Jenkins, III et al. | |
| 4,803,251 A | 2/1989 | Goode et al. | |
| 5,026,795 A | 6/1991 | Hogan | |
| 5,028,670 A | 7/1991 | Chinh et al. | |
| 5,317,036 A | 5/1994 | Brady, III et al. | |
| 5,332,706 A | 7/1994 | Nowlin et al. | |
| 5,352,749 A | 10/1994 | DeChellis et al. | |
| 5,391,657 A | 2/1995 | Song et al. | |
| 5,405,922 A | 4/1995 | DeChellis et al. | |
| 5,427,991 A | 6/1995 | Turner | |
| 5,436,304 A | 7/1995 | Griffin et al. | |
| 5,453,471 A | 9/1995 | Bernier et al. | |
| 5,462,999 A | 10/1995 | Griffin et al. | |
| 5,473,028 A | 12/1995 | Nowlin et al. | |
| 5,492,975 A | 2/1996 | Peifer et al. | |
| 5,616,661 A | 4/1997 | Eisinger et al. | |
| 5,627,242 A | 5/1997 | Jacobsen et al. | |
| 5,643,847 A | 7/1997 | Walzer, Jr. | |
| 5,648,308 A | 7/1997 | Lee et al. | |
| 5,648,581 A | 7/1997 | Kubo et al. | |
| 5,661,095 A | 8/1997 | Meverden et al. | |
| 5,665,818 A | 9/1997 | Tilston et al. | |
| 5,668,228 A | 9/1997 | Chinh et al. | |
| 5,677,375 A | 10/1997 | Rifi et al. | |
| 5,783,512 A * | 7/1998 | Jacobsen et al. | 502/124 |
| 5,804,678 A | 9/1998 | Morita et al. | |
| 6,008,662 A | 12/1999 | Newton et al. | |

(Continued)

FOREIGN PATENT DOCUMENTS

| | | |
|---|---|---|
| EP | 85411 B1 | 6/1986 |
| EP | 649992 B1 | 7/1997 |
| EP | 802202 A1 | 10/1997 |
| EP | 811638 A2 | 12/1997 |
| EP | 1106629 A1 | 6/2001 |
| EP | 1082351 B1 | 7/2003 |

(Continued)

*Primary Examiner* — Caixia Lu (57) ABSTRACT

A polymerization process includes contacting the following in a gas-phase reactor system under polymerization conditions for making a polymer product: a metallocene-based catalyst system including a supported constrained geometry catalyst, at least one monomer, and an additive selected from a group consisting of an aluminum distearate, an ethoxylated amine, and a mixture thereof. The additive may be selected from a group consisting of an aluminum distearate, an ethoxylated amine, polyethylenimines, and other additives suitable for use in the production of polymers for food contact applications and end products, including a mixture of a polysulfone copolymer, a polymeric polyamine, and oil-soluble sulfonic acid, in a carrier fluid, and mixtures thereof.

7 Claims, 2 Drawing Sheets

(56) References Cited

U.S. PATENT DOCUMENTS

| | | |
|---|---|---|
| 6,117,955 A | 9/2000 | Agapiou et al. |
| 6,140,432 A | 10/2000 | Agapiou et al. |
| 6,225,423 B1 | 5/2001 | Andell et al. |
| 6,245,868 B1 | 6/2001 | Agapiou et al. |
| 6,271,165 B1 | 8/2001 | Jacobsen et al. |
| 6,300,436 B1 | 10/2001 | Agapiou et al. |
| 6,306,984 B1 | 10/2001 | Agapiou et al. |
| 6,355,594 B1 | 3/2002 | McDaniel et al. |
| 6,362,290 B2 | 3/2002 | Durand et al. |
| 6,391,819 B1 | 5/2002 | Agapiou et al. |
| 6,472,342 B2 | 10/2002 | Agapiou et al. |
| 6,548,610 B2 | 4/2003 | Bartilucci et al. |
| 6,562,924 B2 | 5/2003 | Benazouzz et al. |
| 6,639,028 B2 | 10/2003 | Heslop et al. |
| 6,689,847 B2 | 2/2004 | Mawson et al. |
| 6,894,127 B2 | 5/2005 | Behue et al. |
| 6,998,440 B2 | 2/2006 | Alarcon et al. |
| 7,205,363 B2 | 4/2007 | Dickey et al. |
| 7,273,912 B2 | 9/2007 | Jacobsen et al. |
| 7,300,988 B2 * | 11/2007 | Kolb et al. .............. 526/170 |
| 2002/0091208 A1 | 7/2002 | Benazouzz et al. |
| 2002/0103072 A1 | 8/2002 | Patrick et al. |
| 2003/0032549 A1 | 2/2003 | Vogel |
| 2004/0044155 A1 | 3/2004 | Chai et al. |
| 2007/0066773 A1 | 3/2007 | Kimberley et al. |
| 2007/0282085 A1 * | 12/2007 | McKay et al. .............. 526/129 |
| 2008/0027185 A1 | 1/2008 | Markel et al. |
| 2011/0130531 A1 * | 6/2011 | Hussein et al. .............. 526/130 |

FOREIGN PATENT DOCUMENTS

| | | |
|---|---|---|
| EP | 1303545 B1 | 8/2004 |
| EP | 1263809 B1 | 5/2006 |
| EP | 1578811 B1 | 4/2007 |
| EP | 2133367 A1 | 12/2009 |
| WO | 9706186 A1 | 2/1997 |
| WO | 9715602 A1 | 5/1997 |
| WO | 9719959 A1 | 6/1997 |
| WO | 9827119 A1 | 6/1998 |
| WO | 9961485 A1 | 12/1999 |
| WO | 2005068507 A1 | 7/2005 |
| WO | 2007137396 A1 | 12/2007 |

* cited by examiner

FIG. 1

POLYMERIZATION PROCESS USING A SUPPORTED CONSTRAINED GEOMETRY CATALYST

CROSS-REFERENCE TO RELATED APPLICATIONS

This application is a National Stage application under 36 U.S.C. §371 of International Application No. PCT/US2010/043365, filed Jul. 27, 2010, that claims the benefit of Ser. No. 61/229,158, filed Jul. 28, 2009, the disclosures of which are incorporated by reference in their entireties.

BACKGROUND

Sheeting and chunking have been a problem in commercial, gas phase polyolefin production reactors for many years. The problem is characterized by the formation of solid masses of polymer on the walls of the reactor. These solid masses of polymer (the sheets) eventually become dislodged from the walls and fall into the reaction section, where they interfere with fluidization, block the product discharge port, and usually force a reactor shut-down for cleaning, any one of which can be termed a "discontinuity event," which in general is a disruption in the continuous operation of a polymerization reactor. The terms "sheeting," "chunking," and/or "fouling" while used synonymously herein, may describe different manifestations of similar problems, in each case they can lead to a reactor discontinuity event.

There are at least two distinct forms of sheeting that occur in gas phase reactors. The two forms (or types) of sheeting may be described as wall sheets or dome sheets, depending on where they are formed in the reactor. Wall sheets are formed on the walls (generally vertical portions) of the reaction section, such as walls 110 in FIG. 1. Dome sheets are formed much higher in the reactor, on the conical section of the dome, or on the hemi-spherical head on the top of the reactor, such as near the "dome" section 114 of the reactor shown in FIG. 1.

When sheeting occurs with metallocene catalysts, it generally occurs in either the lower section of the reactor and is referred to as wall sheeting, and/or it occurs near the dome of the reactor and is referred to as dome sheeting, e.g., both wall sheeting and dome sheeting can occur when using a metallocene catalyst.

Dome sheeting has been particularly troublesome with metallocene catalyst systems. Typical metallocene compounds are generally described as containing one or more ligands capable of bonding to a transition metal atom, usually, cyclopentadienyl derived ligands or moieties, in combination with a transition metal selected from Group 4, 5, or 6 or from the lanthanide and actinide series of the Periodic Table of Elements.

One characteristic that makes it difficult to control sheeting with metallocene catalysts is their unpredictable static tendencies. For instance, European Pat. No. EP0811638A2 describes metallocene catalysts as exhibiting sudden erratic static charge behavior that can appear after long periods of stable behavior.

As a result of the reactor discontinuity problems associated with using metallocene catalysts, various techniques have been developed that are said to result in improved operability. For example, various supporting procedures or methods for producing a metallocene catalyst system with reduced tendencies for fouling and better operability have been discussed in U.S. Pat. No. 5,283,218, which discloses the prepolymerization of a metallocene catalyst. U.S. Pat. Nos. 5,332,706 and 5,473,028 disclose a particular technique for forming a catalyst by "incipient impregnation." U.S. Pat. Nos. 5,427,991 and 5,643,847 disclose the chemical bonding of non-coordinating anionic activators to supports. U.S. Pat. No. 5,492,975 discloses polymer bound metallocene catalyst systems. U.S. Pat. No. 5,661,095 discloses supporting a metallocene catalyst on a copolymer of an olefin and an unsaturated silane. U.S. Pat. No. 5,648,308 discloses removing inorganic and organic impurities after formation of the metallocene catalyst itself. PCT Pub. No. WO97/15602 discloses readily supportable metal complexes. U.S. Pat. No. 6,225,423 discloses forming a supported transition metal compound in the presence of an unsaturated organic compound having at least one terminal double bond.

Various methods for controlling sheeting have been developed. These methods often involve monitoring the static charges near the reactor wall in regions where sheeting is known to develop and introducing a static control agent into the reactor when the static levels fall outside a predetermined range. For example, U.S. Pat. Nos. 4,803,251 and 5,391,657 disclose the use of various chemical additives in a fluidized bed reactor to control static charges in the reactor. A positive charge generating additive is used if the static charge is negative, and a negative charge generating additive is used if the static charge is positive. The static charge in the reactor is typically measured at or near the reactor wall at or below the site where sheet formation usually occurs, using static voltage indicators such as voltage or current probes or electrodes.

U.S. Pat. No. 6,548,610 describes a method of preventing dome sheeting (or "drooling") by measuring the static charge with a Faraday drum and feeding static control agents to the reactor to maintain the measured charge within a predetermined range. U.S. Pat. No. 6,548,610 also discloses the use of conventional static probes, such as those described in U.S. Pat. Nos. 6,008,662, 5,648,581, and 4,532,311. Other background references include WO 99/61485, WO 2005/068507, EP 0811638A, EP 1106629A, and U.S. Pat. Appl. Pub. Nos. 2002/103072 and 2008/027185.

Others have discussed different process modifications for improving reactor continuity with metallocene catalysts. There are various other known methods for improving operability including coating the polymerization equipment, controlling the polymerization rate, particularly on start-up, and reconfiguring the reactor design and injecting various agents into the reactor.

Although various methods have been developed to manage sheeting problems with metallocene catalysts and use of continuity additives has been investigated, the problem persists. One reason the problem persists is that the use of continuity additives can be accompanied by decreased catalyst efficiencies and productivities. Decreased catalyst efficiencies and catalyst productivities may occur where additives injections are not matched precisely in regards to frequency and/or amount to arrest transient instances of reactor static, which can presage undesirable "reactor discontinuity events."

As can be seen from all of these patents directed toward improving polymerization reaction operability in gas-phase reactor systems, there is a need for improving the polymerization reaction process in gas-phase reactors when using metallocene catalysts of all types. Thus, it would be advantageous to have a polymerization process utilizing metallocene catalysts, the process being capable of operating continuously with enhanced reactor operability (defined as the general absence of sheeting or chunks that might lead to reactor discontinuity events) while refraining from depressing catalyst productivities.

SUMMARY

The present invention is broadly directed to various methods for production of a polymer product, as well as gas phase, fluidized bed production of polyolefins such as polyethylene.

The polymerization process includes contacting in a gas-phase reactor system under polymerization conditions for creating a polymer product: a metallocene-based catalyst system including a supported constrained geometry catalyst, at least one monomer, and an additive.

The additive may be selected from a group consisting of aluminum distearate; an ethoxylated amine; a mixture of a polysulfone copolymer, a polymeric polyamine, and oil-soluble sulfonic acid in a carrier fluid including a light hydrocarbon; polyethylenimines having the general formula —(CH$_2$—CH$_2$—NH)$_n$—, where n is from about 10 to about 10,000; and mixtures thereof. The additive is preferably a mixture of aluminum distearate and ethoxylated amine.

The metallocene-based catalyst system may comprise a supported constrained geometry metallocene catalyst that includes a borate anion.

DETAILED DESCRIPTION

Before the present compounds, components, compositions, and/or methods are disclosed and described, it is to be understood that unless otherwise indicated this invention is not limited to specific compounds, components, compositions, reactants, reaction conditions, structures, or the like, and as such may vary, unless otherwise specified. It is also to be understood that the terminology used herein is for the purpose of describing particular embodiments only and is not intended to be limiting.

It must also be noted that, as used in the specification and the appended claims, the singular forms "a," "an," and "the" include plural referents unless otherwise specified.

All concentrations expressed herein are concentrations in terms of parts per million by volume unless otherwise stated.

All references herein to elements or metals belonging to a certain Group refer to the Periodic Table of the Elements published and copyrighted by CRC Press, Inc., 1989. Also any reference to the Group or Groups shall be to the Group or Groups as reflected in this Periodic Table of the Elements using the IUPAC system for numbering groups.

A 'metallocene' as used herein refers to a metal having at least one cyclopentadienyl (Cp) anion bound thereto. For example, a metallocene may have one, two, or more Cp rings bound to a metal.

The polymerization process includes contacting a metallocene-based catalyst system comprising a supported constrained geometry catalyst, at least one monomer, and an additive in a gas-phase reactor system under polymerization conditions for creating a polymer product.

The additive may be selected from the group consisting of an aluminum distearate; an ethoxylated amine; a mixture of a polysulfone copolymer, a polymeric polyamine, and oil-soluble sulfonic acid in a carrier fluid including a light hydrocarbon; polyethylenimines having the general formula —(CH$_2$—CH$_2$—NH)$_n$—, where n is from about 10 to about 10,000; and a mixture thereof.

The additive may be suitable for use in the production of polymers for food contact applications and end products. For example, the additive may include a mixture of a polysulfone copolymer, a polymeric polyamine, and oil-soluble sulfonic acid, in a carrier fluid (solvent) including a light hydrocarbon.

The additive that may include polyethylenimines having the following general formula:

—(CH$_2$—CH$_2$—NH)$_n$— where n may be from about 10 to about 10,000.

For ease of understanding of the reader, as well as to place the various embodiments of the invention in a context, much of the following description shall be presented in terms of a commercial, gas phase polyethylene production system. It should be kept in mind that this is done by way of non-limiting example only.

Using the methods and systems as described herein results in reliable, commercially useful and cost effective continuous polyolefin production.

The methods described herein may be useful in any reaction process, including polymerization process, solution, slurry, and high pressure processes.

Polymerization Process

Gas phase polymerization reactions may be carried out in fluidized bed polymerization reactors, and can also be formed in stirred or paddle-type reactor systems (e.g., stirred bed systems) which include solids in a gaseous environment. While the following discussion will feature fluidized bed systems, where the present invention has been found to be preferred and especially advantageous, it is to be understood that the general concepts, which are discussed relevant to the preferred fluidized bed systems, may also be adaptable to the stirred or paddle-type reactor systems as well.

A fluidized bed can generally include a bed of particles in which the static friction between the particles is disrupted. In each of the aforementioned generally preferred approaches and/or embodiments. A fluidized bed system can comprise one or more fluids and one or more types of fluidized particles that are generally bounded by a barrier so that the fluids and particles are constrained. For example, a fluidized bed system may include a pipeline (e.g., for particle transport); a recirculating fluidized bed system, such as the fluidized bed polymerization reactor system of FIG. 1; any of which may be associated with various residential, commercial and/or industrial applications.

The fluidized bed in preferred embodiments is generally formed by flow of a gaseous fluid in a direction opposite gravity. The frictional drag of the gas on the solid particles overcomes the force of gravity and suspends the particles in a fluidized state referred to as a fluidized bed. To maintain a viable fluidized bed, the superficial gas velocity through the bed must exceed the minimum flow required for fluidization. Increasing the flow of the fluidizing gas increases the amount of movement of the particles in the bed, and can result in a beneficial or detrimental tumultuous mixing of the particles. Decreasing the flow results in less drag on the particles, ultimately leading to collapse of the bed. Fluidized beds formed by gases flowing in directions other than vertically include particles flowing horizontally through a pipe, particles flowing downwardly e.g., through a downcomer, etc.

Fluidized beds can also be formed by vibrating or otherwise agitating the particles. The vibration or agitation keeps the particles in a fluidized state.

Figure 1:
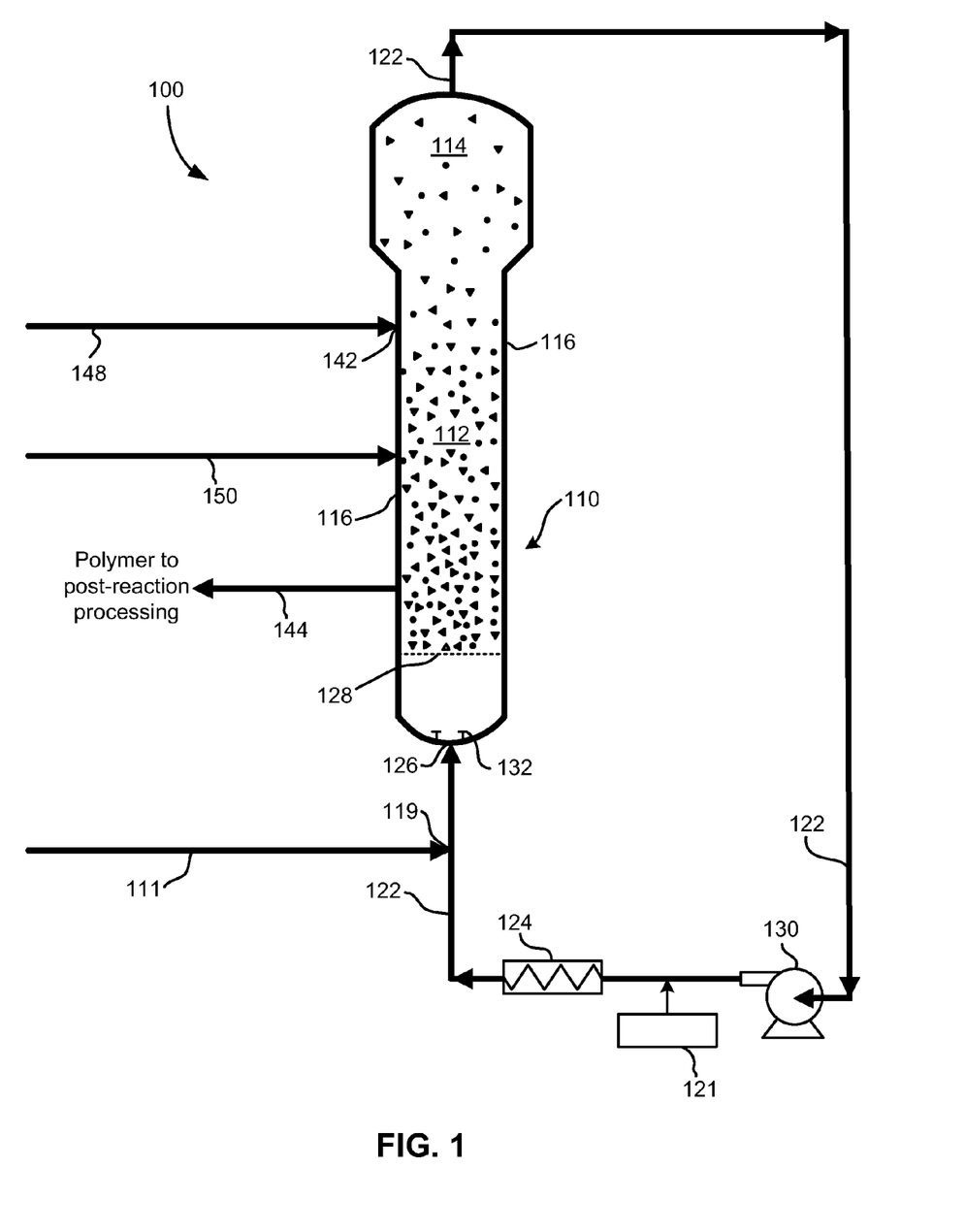
FIG. 1 shows a schematic diagram of an illustrative gas phase reactor.

In very general terms, a conventional fluidized bed polymerization process for producing resins and other types of polymers is conducted by passing a gaseous stream containing one or more monomers continuously through a fluidized bed reactor under reactive conditions and in the presence of catalyst at a velocity sufficient to maintain the bed of solid particles in a suspended condition. A continuous cycle is employed where the cycling gas stream, otherwise known as a recycle stream or fluidizing medium, is heated in the reactor by the heat of polymerization. The hot gaseous stream, also containing unreacted gaseous monomer, is continuously withdrawn from the reactor, compressed, cooled and recycled into the reactor. Product is withdrawn from the reactor and make-up monomer is added to the system, e.g., into the recycle stream or reactor, to replace the polymerized monomer. See for example U.S. Pat. Nos. 4,543,399, 4,588,790, 5,028,670, 5,317,036, 5,352,749, 5,405,922, 5,436,304, 5,453,471, 5,462,999, 5,616,661, 5,668,228, and 6,689,847. A basic, conventional fluidized bed system 100 is illustrated in FIG. 1. The reactor vessel 110 (also referred to herein a "reactor") comprises a reaction zone 112 and a velocity reduction zone 114 (also referred to herein as the "dome" section). While a reactor configuration comprising a generally cylindrical region beneath an expanded section is shown in FIG. 1, alternative configurations such as a reactor configuration comprising an entirely or partially tapered reactor may also be utilized. In such configurations, the fluidized bed can be located within a tapered reaction zone but below a region of greater cross-sectional area which serves as the velocity reduction zone of the more conventional reactor configuration shown in FIG. 1.

The reaction zone 112 includes a bed of growing polymer particles, formed polymer particles, and a minor amount of catalyst all fluidized by the continuous flow of polymerizable and modifying gaseous components, including inerts, in the form of make-up feed and recycle fluid through the reaction zone. To maintain a viable fluidized bed, the superficial gas velocity through the bed must exceed the minimum flow required for fluidization which is typically from about 0.2 to about 0.5 ft/sec for polyolefins. Preferably, the superficial gas velocity is at least 0.2 ft/sec above the minimum flow for fluidization or from about 0.4 to about 0.7 ft/sec.

On start-up, the reactor is generally charged with a bed of particulate polymer particles before gas flow is initiated. Such particles help to prevent the formation of localized "hot spots" when catalyst feed is initiated. They may be the same as the polymer to be formed or different. When different, they are preferably withdrawn with the desired newly formed polymer particles as the first product. Eventually, a fluidized bed primarily of desired polymer particles supplants the start-up bed.

Also, on start-up, the catalyst is injected into the fluidized bed polymerization reactor system, typically into the reactor vessel. The same catalyst may be used for continuous, steady state polymerization after start-up, a different catalyst may be injected into the reactor system after start-up, or both catalysts may be injected after start-up.

In some embodiments, antistatic agents may be added to the fluidized bed polymerization reactor system during start-up. In other embodiments, no antistatic agents are added to the fluidized bed polymerization reactor system during start-up.

Fluidization is achieved by a high rate of fluid recycle to and through the bed, typically on the order of about 50 times the rate of feed or make-up fluid. This high rate of recycle provides the requisite superficial gas velocity necessary to maintain the fluidized bed. The fluidized bed has the general appearance of dense mass of individually moving particles as created by the percolation of gas through the bed. The pressure drop through the bed is equal to or slightly greater than the weight of the bed divided by the cross-sectional area.

Referring again to FIG. 1, make-up fluids can be fed at point 119 via feed line 111 and recycle line 122. The composition of the recycle stream is typically measured by a gas analyzer 121 and the composition and amount of the make-up stream is then adjusted accordingly to maintain an essentially steady state composition within the reaction zone. The gas analyzer 121 can be positioned to receive gas from a point between the velocity reduction zone 114 and heat exchanger 124, preferably, between compressor 130 and heat exchanger 124.

To ensure complete fluidization, the recycle stream and, where desired, at least part of the make-up stream can be returned through recycle line 122 to the reactor, for example at inlet 126 below the bed. Preferably, there is a gas distributor plate 128 above the point of return to aid in fluidizing the bed uniformly and to support the solid particles prior to start-up or when the system is shut down. The stream passing upwardly through and out of the bed helps remove the heat of reaction generated by the exothermic polymerization reaction.

The portion of the gaseous stream flowing through the fluidized bed which did not react in the bed becomes the recycle stream which leaves the reaction zone 112 and passes into the velocity reduction zone 114 above the bed where a major portion of the entrained particles drop back onto the bed thereby reducing solid particle carryover.

The recycle stream is then compressed in compressor 130 and passed through heat exchanger 124 where the heat of reaction is removed from the recycle stream before it is returned to the bed. Note that the heat exchanger 124 can also be positioned before the compressor 130. An illustrative heat exchanger 124 is a shell and tube heat exchanger, with the recycle gas traveling through the tubes.

The recycle stream exiting the heat exchange zone is then returned to the reactor at its base 126 and thence to the fluidized bed through gas distributor plate 128. A fluid flow deflector 132 is preferably installed at the inlet to the reactor to prevent contained polymer particles from settling out and agglomerating into a solid mass and to maintain entrained or to re-entrain any particles or liquid which may settle out or become disentrained.

The polymer product may be discharged from line 144. Although not shown, it is desirable to separate any fluid from the product and to return the fluid to the reactor vessel 110.

The polymerization catalyst may enter the reactor in solid or liquid form at a point 142 through line 148. If one or more co-catalysts are to be added, as is often the case, the one or more cocatalysts may be introduced separately into the reaction zone where they will react with the catalyst to form the catalytically active reaction product and/or affect the reaction proceeding in the reactor system. However the catalyst and cocatalyst(s) may be mixed prior to their introduction into the reaction zone.

A continuity additive, a compound that improves the operation of the reactor by reducing or eliminating the formation of fused polymer agglomerates and/or decreasing the magnitude of static electricity level, may be added in situ to the reactor system 100 via an appropriate mechanism such as feed line 148 or another feed line 150. Such compounds may alternatively be added to the catalyst prior to its introduction to the reactor and/or mixed with the catalyst as it is introduced to the reactor. Particularly preferred continuity additives include aluminum distearate, ethoxylated amine, and/or a mixture thereof, and other continuity additives suitable for use in the production of polymers for food contact applications and end products, including a mixture of a polysulfone copolymer, a polymeric polyamine, and oil-soluble sulfonic acid, in a carrier fluid (solvent) including a light hydrocarbon. Another preferred continuity additive includes polyethylenimines having the following general formula:

where n may be from about 10 to about 10,000.

The reactor shown in FIG. 1 is particularly useful for forming polyolefins such as polyethylene, polypropylene, etc. Process conditions, raw materials, catalysts, etc., for forming various polyolefins and other reaction products are found in the references listed herein. Illustrative process conditions for polymerization reactions in general are listed below to provide general guidance.

The reaction vessel, for example, has an inner diameter of at least about 6 inches in the region where the fluid bed resides, and is generally greater than about 8 feet on the industrial-scale, and can exceed 15 or 17 feet.

The reactor pressure in a gas phase process may vary from about 100 psig (690 kPa) to about 600 psig (4138 kPa), preferably in the range of from about 200 psig (1379 kPa) to about 400 psig (2759 kPa), more preferably in the range of from about 250 psig (1724 kPa) to about 350 psig (2414 kPa).

The reactor temperature in a gas phase process may vary from about 30° C. to about 120° C. In one approach, the reactor temperature is less than about 40° C., 30° C., more preferably less than about 20° C., and even more preferably less than about 15° C. below the melting point of the polyolefin being produced. The process can run at even higher temperatures, e.g., less than about 10° C. or 5° C. below the melting point of the polyolefin being produced. Polyethylene, for example, has a melting point in the range of approximately 125° C. to 130° C.

The overall temperature in a gas phase process typically varies from about 30° C. to about 125° C. In one approach, the temperature at the point of highest temperature in the reactor system is less than about 30° C., or less than about 20° C., or less than about 15° C. below the melting point of the polyolefin being produced. In a system such as that shown in FIG. 1, the point of highest temperature is typically at the outlet of the compressor 130.

Other gas phase processes contemplated include series or multistage polymerization processes. Also gas phase processes contemplated by the invention include those described in U.S. Pat. Nos. 5,627,242, 5,665,818, 5,677,375, 5,804,678 and 6,362,290, and European publications EP-B1-0 649 992, and EP-A-0 802 202.

In any of the embodiments described herein, the gas phase process may be operated in a condensed mode, where an inert condensable fluid is introduced to the process to increase the cooling capacity of the reactor system. These inert condensable fluids are referred to as induced condensing agents or ICA's. Condensed mode processes are further described in U.S. Pat. Nos. 5,342,749 and 5,436,304.

An industrial-scale reactor that may be utilized is capable of producing greater than 227 kg of polymer per hour (Kg/hr) to about 90,900 Kg/hr or higher of polymer. The reactor may be capable of producing greater than 455 Kg/hr, or greater than 4540 Kg/hr, or greater than 11,300 Kg/hr, or greater than 15,900 Kg/hr, or greater than 22,700 Kg/h, or greater than 29,000 Kg/hr, or greater than 45,500 Kg/hr.

Of course, other reactor vessel systems may be used also, and the embodiments described herein are not limited to the reactor system shown in FIG. 1. For example, another reactor system may be used that is similar to the system described in FIG. 1, but with some differences. One of the differences between the systems is the inclusion of a recycle system. A simple and streamlined yet efficient recycle system that includes a compressor and cooler may be used, with no need for additional equipment for handling fines or for operation in a condensing mode. Alternatively, the recycle system may include a cyclone system to remove resin fines from the recycled gas to reduce compressor and cooler fouling.

Also, one or more heat exchangers may be included in the recycle loop. In addition, vent recovery systems may be used, e.g., membrane separation system, to recover vented gases.

Except where defined herein, the operating conditions of the reactor and other systems are not narrowly critical to the invention. While general operating conditions have been provided above for fluidized bed polymerization reactor systems, fluidized and nonfluidized bed systems can, in addition to those listed above, have widely varying process conditions, such as temperature, pressure, fluid flowrate, etc.

Polymerization conditions generally refer to one or more of temperature, pressure, monomer content (including comonomer concentration), catalyst concentration, cocatalyst concentration, activator concentration, etc., that influence the molecular weight and other characteristics of the polymer produced.

Draw Materials and Polymer Products

The term "polymer" as used herein refers to a macromolecular compound prepared by polymerizing monomers of the same or a different type. A polymer refers to homopolymers, copolymers, terpolymers, interpolymers, and so on. The term "interpolymer" used herein refers to polymers prepared by the polymerization of at least two types of monomers or comonomers. It includes, but is not limited to, copolymers (which usually refers to polymers prepared from two different monomers or comonomers), terpolymers (which usually refers to polymers prepared from three different types of monomers or comonomers), and tetrapolymers (which usually refers to polymers prepared from four different types of monomers or comonomers), and the like. The term "monomer" or "comonomer" refers to any compound with a polymerizable moiety which is added to a reactor in order to produce a polymer. The term "polyolefin" refers to any polymer containing an olefinic monomer.

The polymers may be produced from monomers selected from ethylene, propylene, 1-butene, 1-hexene, 1-pentene, 4-methyl-1-pentene, 1-octene, 1-decene, vinyl-cyclohexene, styrene, ethylidene norbornene, norbornadiene, 1,3-butadiene, 1,5-hexadiene, 1,7-octadiene, 1,9-decadiene, or a combination thereof. The polymers may be homopolymers of ethylene or copolymers of ethylene with one or more $C_3$-$C_{20}$ alpha-olefins. Thus, copolymers having two monomeric units are possible as well as terpolymers having three monomeric units. Particular examples of such polymers include ethylene/1-butene copolymers, ethylene/1-hexene copolymers, ethylene/1-octene copolymers, ethylene/4-methyl-1-pentene copolymers, ethylene/1-butene/1-hexene terpolymers, ethylene/propylene/1-hexene terpolymers and ethylene/propylene/1-butene terpolymers. When propylene is employed as a comonomer, the resulting linear low density polyethylene copolymer preferably has at least one other alpha-olefin comonomer having at least four carbon atoms in an amount of at least 1 percent by weight of the polymer. Accordingly, ethylene/propylene copolymers are possible.

Fluids

In general, for example, the reactor systems and methods described herein can be used in connection with liquids and/ or gases having a wide range of fluid properties, such as a wide range of viscosities, densities and/or dielectric constants (each such property being considered independently or collectively as to two or more thereof). For example, liquid fluids can generally have viscosities ranging from about 0.1 cP to about 100,000 cP, and/or can have densities ranging from about 0.0005 g/cc to about 20 g/cc and/or can have a dielectric constant ranging from about 1 to about 100. In many embodiments of the invention, the bulk material is a gaseous fluid. Gaseous fluids can, for example, generally have viscosities ranging from about 0.001 to about 0.1 cP, and/or can have densities ranging from about 0.0005 to about 0.1 g/cc and/or can have a dielectric constant ranging from about 1 to about 1.1.

The bulk material can include relatively pure gaseous elements (e.g., $N_2$, $H_2$, $O_2$, etc.). Other components can include relatively pure liquid, solid, or gaseous compounds (e.g., liquid or solid catalyst, gaseous monomer). The various systems of embodiments of the invention can also include single-phase or multi-phase mixtures of gases, solids and/or liquids, including for example: two-phase mixtures of solids and gases (e.g., fluidized bed systems), mixtures of gasses with a single type of particle, mixtures of gasses with different types of particles (e.g., polymer and catalyst particles); and/or three-phase mixtures of gasses, liquids and solids (e.g., fluidized bed with liquid catalyst being added). Particular examples of preferred fluids are described herein, including in discussion below regarding preferred applications of the methods and devices of embodiments of the invention.

Metallocene-Based Catalyst System

Described herein are supported constrained geometry metallocene catalyst systems that may minimize sensitivity to wall and expanded section sheeting. One illustrative metallocene based catalyst is a supported constrained geometry catalyst (sCGC) comprising (a) an ionic complex, (b) a transition metal compound, (c) an organometal compound, and (d) a support material. The catalyst may be supported on a solid support such as dehydrated silica, e.g., Davison 955 silica dehydrated at about 200° C. (available from W. R. Grace & Co.—Conn., 7237 East Gage Ave., Los Angeles, Calif. 90040). Illustrative catalysts include those described in U.S. Pat. No. 6,271,165.

In one approach, there is provided a dispersion of a supported catalyst component comprising (a) an ionic compound comprising (a)(1) a cation and (a)(2) an anion having up to 100 nonhydrogen atoms and the anion containing at least one substituent comprising a moiety having an active hydrogen and (d) a support material, wherein the supported catalyst component is in solid form dispersed in a diluent in which both (a) and (d) are insoluble or sparingly soluble, and wherein,
  (i) the support material is a pretreated support material and in the supported catalyst component the anion (a)(2) is not chemically bonded to the support (d), or
  (ii) the ionic compound has a solubility in toluene at 22° C. of at least 0.1 weight percent, the support material used is a support material containing tethering groups and in the supported catalyst component the anion (a)(2) is chemically bonded to the support (d).

Desirable embodiments of the aforementioned dispersions are those wherein the catalyst component further comprises (b) a transition metal compound and wherein the catalyst component is a substantially inactive catalyst precursor; or wherein the catalyst component further comprises (c) an organometal or metalloid compound wherein the metal or metalloid is selected from the Groups 1-14 of the Periodic Table of the Elements and the catalyst component is a reaction product of (a) and (c), while in other desirable embodiments the catalyst component excludes (b) a transition metal compound, excludes (c) an organometal or metalloid compound wherein the metal or metalloid is selected from the Groups 1-14 of the Periodic Table of the Elements, or excludes both (b) and (c).

In another approach, there is provided a supported solid catalyst comprising (a) an ionic compound comprising (a)(1) a cation and (a)(2) an anion having up to 100 nonhydrogen atoms and the anion containing at least one substituent comprising a moiety having an active hydrogen, (b) a transition metal compound, (c) an organometal or metalloid compound wherein the metal or metalloid is selected from the Groups 1-14 of the Periodic Table of the Elements, and (d) a support material, wherein,
  (i) the support material is a pretreated support material and in the supported catalyst component the anion (a)(2) is not chemically bonded to the support (d), or
  (ii) the ionic compound has a solubility in toluene at 22° C. of at least 0.1 weight percent, the support material used is a support material containing tethering groups and in the supported catalyst component the anion (a)(2) is chemically bonded to the support (d); and,
  wherein the solid catalyst is obtained by combining components (a), (b), (c), and (d) in any order, and wherein, during at least one step in the preparation of the solid catalyst, component (a) is dissolved in a diluent in which (a) is soluble, optionally in the presence of one or more of components (b), (c), and (d) or the contact product of (a) with such one or more of (b), (c), and (d), and then is converted into solid form.

In the aforementioned approaches, the anion (a)(2) may correspond to Formula (II):

(II)

wherein:
  M' is a metal or metalloid selected from Groups 5-15 of the Periodic Table of the Elements;
  Q independently in each occurrence is selected from the group consisting of hydride, dihydrocarbylamido, halide, hydrocarbyloxide, hydrocarbyl, and substituted-hydrocarbyl radicals, including halo-substituted hydrocarbyl radicals, and hydrocarbyl- and halohydrocarbyl-substituted organo-metalloid radicals, the hydrocarbyl portion in each of these groups preferably having from 1 to 20 carbons, with the proviso that in not more than one occurrence is Q halide;
  G is a polyvalent hydrocarbon radical having r+1 valencies bonded to M' and r groups (T-H);
  the group (T-H) is a radical wherein T comprises O, S, NR, or PR, the O, S, N of P atom of which is bonded to hydrogen atom H wherein R is a hydrocarbyl radical, a trihydrocarbylsilyl radical, a trihydrocarbyl germyl radical or hydrogen;
  m is an integer from 1 to 7;
  n is an integer from 0 to 7;
  q is an integer of 0 or 1;
  r is an integer from 1 to 3;
  z is an integer from 1 to 8;
  d is an integer from 1 to 7; and
  n+z−m=d, and
  where the cation (a)(1) of ionic compound (a) is represented by the following general formula:

, wherein:
L* is a nitrogen, oxygen, sulfur or phosphorus containing Lewis base containing from one to three $C_{10-40}$ alkyl groups with a total of from 12 to 100 carbons.

Preferably, anions (a)(2) may be represented by a single coordination complex of the following general Formula (II):

$$[M'^{m+}Q_n(G_q(T-H)_r)_z]^{d-} \quad (II)$$

wherein:
M' is a metal or metalloid selected from Groups 5-15 of the Periodic Table of the Elements;
Q independently in each occurrence is selected from the group consisting of hydride, dihydrocarbylamido, preferably dialkylamido, halide, hydrocarbyloxide, preferably alkoxide and aryloxide, hydrocarbyl, and substituted-hydrocarbyl radicals, including halo-substituted hydrocarbyl radicals, and hydrocarbyl- and halohydrocarbyl-substituted organo-metalloid radicals, the hydrocarbyl portion in each of these groups preferably having from 1 to 20 carbons, with the proviso that in not more than one occurrence is Q halide;
G is a polyvalent hydrocarbon radical having r+1 valencies, and preferably a divalent hydrocarbon radical, bonded to M' and r groups (T-H); the group (T-H) is a radical wherein T comprises O, S, NR, or PR, the O, S, N, or P atom of which is bonded to hydrogen atom H, wherein R is a hydrocarbon radical, a trihydrocarbyl silyl radical, a trihydrocarbyl germyl radical, or hydrogen;
m is an integer from 1 to 7, preferably 3;
n is an integer from 0 to 7, preferably 3;
q is an integer 0 or 1, preferably 1;
r is an integer from 1 to 3, preferably 1;
z is an integer from 1 to 8, preferably 1 or 2;
d is an integer from 1 to 7, preferably 1; and
n+z−m=d.

When q is 0 and polyvalent hydrocarbon radical G is not present, T is bound to M'.

Preferred boron-containing anions (a)(2) which are particularly useful in embodiments of this invention may be represented by the following general Formula (III):

$$[BQ_{4-z'}(G_q(T-H)_r)_{z'}]^{d-} \quad (III)$$

wherein:
B is boron in a valence state of 3;
z' is an integer from 1-4, preferably 1 or 2, most preferably 1;
d is 1; and
Q, G, T, H, q, and r are as defined for Formula (II).
Preferably, z' may be 1 or 2, q may be 1, and r may be 1.

In the anion (a)(2), the at least one substituent comprising, a moiety having an active hydrogen preferably corresponds to Formula I:

$$G_q(T-H)_r \quad (I)$$

wherein G is a polyvalent hydrocarbon radical, the group (T-H) is a radical wherein T comprises O, S, NR, or PR, the O, S, N, or P atom of which is bonded to hydrogen atom H, wherein R is a hydrocarbyl radical, a trihydrocarbyl silyl radical, a trihydrocarbyl germyl radical, or hydrogen, H is hydrogen, q is 0 or 1, and preferably 1, and r is an integer from 1 to 3, preferably 1. Polyvalent hydrocarbon radical G has r+1 valencies, one valency being associated with a metal or metalloid of the Groups 5-15 of the Periodic Table of the Elements in the anion, the other r valencies of G being attached to r groups (T-H). Preferred examples of G include di- or trivalent hydrocarbon radicals such as: alkylene, arylene, aralkylene, or alkarylene radicals containing from 1 to 20 carbon atoms, more preferably from 2 to 12 carbon atoms. Suitable examples of divalent hydrocarbon radicals G include phenylene, biphenylene, naphthylene, methylene, ethylene, 1,3-propylene, 1,4-butylene, phenylmethylene ($—C_6H_4—CH_2—$). The polyvalent hydrocarbyl portion G may be further substituted with radicals that do not negatively impact the effect to be achieved by the present invention. Preferred examples of such noninterfering substituents are alkyl, aryl, alkyl- or aryl-substituted silyl and germyl radicals, and fluoro substituents.

The group (T-H) in the previous formula may be an —OH, —SH, —NRH, or —PRH group, wherein R preferably is a $C_{1-18}$, preferably a $C_{1-12}$, hydrocarbyl radical or hydrogen, and H is hydrogen. Preferred R groups are alkyls, cycloalkyls, aryls, arylalkyls, or alkylaryls of 1 to 18 carbon atoms, more preferably those of 1 to 12 carbon atoms. Alternatively, the group (T-H) comprises an —OH, —SH, —NRH, or —PRH group which are part of a larger functional moiety such as, for example, C(O)—OH, C(S)—OH, C(S)—SH, C(O)—SH, C(O)—NRH, C(S)—NRH, and C(O)—PRH, and C(S)—PRH. Most preferably, the group (T-H) is a hydroxy group, —OH, or an amino group, —NRH.

Preferred substituents $G_q$(T-H) in anion (a)(2) include hydroxy- and amino-substituted aryl, aralkyl, alkaryl or alkyl groups, and most preferred are the hydroxyphenyls, especially the 3- and 4-hydroxyphenyl groups and 2,4-dihydroxyphenyl, hydroxytolyls, hydroxybenzyls (hydroxymethylphenyl), hydroxybiphenyls, hydroxynaphthyls, hydroxycyclohexyls, hydroxymethyls, and hydroxypropyls, and the corresponding amino-substituted groups, especially those substituted with —NRH wherein R is an alkyl or aryl radical having from 1 to 10 carbon atoms, such as for example methyl, ethyl, propyl, i-propyl, n-, i-, or t-butyl, pentyl, hexyl, heptyl, octyl, nonyl, and decyl, phenyl, benzyl, tolyl, xylyl, naphthyl, and biphenyl.

Illustrative but not limiting examples of anions (a)(2) of ionic compounds to be used in the present invention are boron-containing anions (boron anions) such as:
triphenyl(hydroxyphenyl)borate,
triphenyl(2,4-dihydroxyphenyl)borate,
tri(p-tolyl)(hydroxyphenyl)borate,
tris-(pentafluorophenyl)(hydroxyphenyl)borate,
tris-(2,4-dimethylphenyl)(hydroxyphenyl)borate,
tris-(3,5-dimethylphenyl)(hydroxyphenyl)borate,
tris-(3,5-di-trifluoromethyl-phenyl)(hydroxyphenyl)borate,
tris(pentafluorophenyl)(2-hydroxyethyl)borate,
tris(pentafluorophenyl)(4-hydroxybutyl)borate,
tris(pentafluorophenyl)(4-hydroxycyclohexyl)borate,
tris(pentafluorophenyl)(4-(4'-hydroxyphenyl)phenyl)borate,
tris(pentafluorophenyl)(6-hydroxy-2-naphthyl)borate, etc.

Further preferred anions (a)(2) include those containing two substituents containing a moiety having an active hydrogen, for example:
diphenyldi(hydroxyphenyl)borate,
diphenyldi(2,4-dihydroxyphenyl)borate,
di(p-tolyl)di(hydroxyphenyl)borate,
di(pentafluorophenyl)di-(hydroxyphenyl)borate,
di(2,4-dimethylphenyl)di(hydroxyphenyl)borate,
di(3,5-dimethylphenyl)di(hydroxyphenyl)borate,
di(3,5-di-trifluoromethylphenyl)di(hydroxyphenyl)borate,
di(pentafluorophenyl)di(2-hydroxyethyl)borate,
di(pentafluorophenyl)di(4-hydroxybutyl)borate,
di(pentafluorophenyl)di(4-hydroxycyclohexyl)borate,
di(pentafluorophenyl)di(4-(4'-hydroxyphenyl)phenyl)borate,
di(pentafluorophenyl)di(6-hydroxy-2-naphthyl)borate, etc.

Other preferred anions are those above-mentioned borates wherein the hydroxy functionality is replaced by an amino NHR functionality wherein R preferably is methyl, ethyl, or t-butyl. A highly preferred anion (a)(2) is tris(pentafluorophenyl)(4-hydroxyphenyl)borate.

The cationic portion (a)(1) of the ionic compound is preferably selected from the group consisting of Bronsted acidic cations, especially ammonium and phosphonium cations or sulfonium cations, carbonium cations, silylium cations, oxonium cations, organometallic cations and cationic oxidizing agents. The cations (a)(1) and the anions (a)(2) are used in such ratios as to give a neutral ionic compound.

Bronsted acidic cations may be represented by the following general formula:

$$(L\text{-}H)^+$$

wherein L is a neutral Lewis base, preferably a nitrogen, phosphorus, oxygen, or sulfur containing Lewis base; and (L-H)$^+$ is a Bronsted acid.

Illustrative, but not limiting, examples of Bronsted acidic cations are trihydrocarbyl- and preferably trialkyl-substituted ammonium cations such as: triethylammonium; tripropylammonium; tri(n-butyl)ammonium; trimethylammonium; tri(i-butyl)ammonium, and tri(n-octyl)ammonium.

Also suitable are N,N-dialkyl anilinium cations such as: N,N-dimethylanilinium; N,N-diethyl-anilinium; N,N-2,4,6-pentamethylanilinium; and N,N-dimethylbenzylammonium.

In addition, dialkylammonium cations are suitable, such as di-(i-propyl)ammonium or dicyclohexylammonium.

Further, triarylphosphonium cations are suitable, such as: triphenylphosphonium; tri(methylphenyl)phosphonium; tri(dimethylphenyl)phosphonium; dimethylsulphonium, diethylsulphonium; and diphenylsulphonium.

In a highly preferred embodiment, the Bronsted acidic cation (a)(1) may be represented by the following general formula:

$$[L^*\text{-}H]^+,$$

wherein L* is a nitrogen, oxygen, sulfur or phosphorus containing Lewis base which comprises at least one relatively long chain alkyl group. Preferably such L* groups contain from one to three $C_{10-40}$ alkyl groups with a total of from 12 to 100 carbons, more preferably two $C_{10-40}$ alkyl groups and from 21 to 90 total carbons. It is understood that the cation may comprise a mixture of alkyl groups of differing lengths which may also be referred to as hydrogenated tallow alkyl groups. For example, one suitable cation is the protonated ammonium salt derived from the commercially available long chain amine comprising a mixture of two $C_{14}$, $C_{16}$ or $C_{18}$ alkyl groups and one methyl group. Such amines are available from Witco Corp., under the trade name Kemamine® T9701, and from Akzo-Nobel under the trade name Armeen® M2HT. These preferred cations are described in U.S. provisional application Ser. No. 60/014,284, filed Mar. 27, 1996, which is incorporated herein by reference. Ionic compounds (a) comprising the cation [L*-H]$^+$ can be easily prepared by subjecting an ionic compound comprising the cation [L-H]$^+$ and the anion (a)(2), as prepared in U.S. patent application Ser. No. 08/610,647, filed Mar. 4, 1996 (corresponding to WO-96/28480), to a cation exchange reaction with a [L*-H]$^+$ salt.

Generally, the preferred ionic compounds have a solubility in toluene at 22° C. of at least 0.1 weight percent, desirably, of at least 0.3 weight percent, more desirably of at least 1 weight percent, preferably of at least 5 weight percent, more preferably of at least 10 weight percent and in some instances even more than 15 weight percent.

Illustrative, but not limiting examples of the highly preferred cations (a)(1) are tri-substituted ammonium salts such as: decyldi(methyl)ammonium; dodecyldi(methyl)ammonium; tetradecyldi(methyl)ammonium; hexaadecyldi(methyl)ammonium; octadecyldi(methyl)ammonium; eicosyldi(methyl)ammonium; methyldi(decyl)ammonium; methyldi(dodecyl)ammonium; methyldi(tetradecyl)ammonium; methyldi(hexadecyl)ammonium; methyldi(octadecyl)ammonium; methyldi(eicosyl)ammonium; tridecylammonium, tridodecylammonium; tritetradecylammonium; trihexadecylammonium; trioctadecylammonium; trieicosylammonium; decyldi(n-butyl)ammonium; dodecyldi(n-butyl)ammonium; octadecyldi(n-butyl)ammonium; N,N-didodecylanilinium; N-methyl-N-dodecylanilinium; N,N-di(octadecyl)(2,4,6-trimethylanilinium); cyclohexyldi(dodecyl) ammonium; and methyldi(dodecyl)ammonium.

Suitable similarly substituted sulfonium or phosphonium cations such as: di(decyl)sulfonium; (n-butyl)dodecylsulfonium; tridecylphosphonium; di(octadecyl)methylphosphonium; and tri(tetradecyl)phosphonium.

Preferred ionic compounds (b) include bis(hydrogenated tallow alkyl)methylammonium tris(pentafluorophenyl)(hydroxyphenyl)$_b$ orate di(octadecyl)methylammonium tris(pentafluorophenyl)(hydroxyphenyl)borate, octadecyl dimethylammonium tris(pentafluorophenyl)(hydroxyphenyl)$_b$ orate and di(octadecyl)(n-butyl)ammonium tris(pentafluorophenyl)(hydroxyphenyl)borate, as well as the amino (—NHR) analogues of these compounds wherein the hydroxyphenyl group is replaced by the aminophenyl group.

Suitable organometal or metalloid compounds (c) for use in the present invention are those comprising a metal or metalloid of Groups 1-14. In one aspect component (c) contains at least one substituent selected from hydride, hydrocarbyl groups, trihydrocarbyl silyl groups, and trihydrocarbyl germyl groups. It is desirable that this at least one substituent be capable of reacting with the moiety having all active hydrogen of the anion (a)(2) of the ionic compound. Additional substituents preferably comprise one or more substituents selected from hydride, halide, hydrocarbyloxide, dihydrocarbylamide hydrocarbyl groups, trihydrocarbyl substituted silyl groups, trihydiocarbyl substituted germyl groups, and hydrocarbyl-, trihydrocarbyl silyl- or trihydrocarbyl germyl-substituted metalloid groups. Desirable organometal or metalloid compound (c) corresponds to the formula:

$$M^{\circ}R^{C}_{x}X^{a}_{y},$$

wherein:
M° is a metal or metalloid selected from Groups 1-14 of the Periodic Table of the Elements,
$R^C$ independently each occurrence is hydrogen or a group having from 1 to 80 nonhydrogen atoms which is hydrocarbyl, hydrocarbylsilyl, trihydrocarbylsilyl, trihydrocarbylgermyl or hydrocarbylsilylhydrocarbyl;
$X^a$ is a noninterfering group having from 1 to 100 nonhydrogen atoms which is halo-substituted hydrocarbyl, hydrocarbylamino-substituted hydrocarbyl, hydrocarbyloxy-substituted hydrocarbyl, hydrocarbylamino, di(hydrocarbyl)amino, hydrocarbyloxy or halide;
x is a nonzero integer which may range from 1 to an integer equal to the valence of M°;
y is zero or a nonzero integer which may range from 1 to an integer equal to 1 less than the valence of M°; and
x+y equals the valence of M°.

Preferred organometal compounds (c) are those where M° is selected from Groups 2, 12, 13 or 14 of the Periodic Table of Elements, more desirably, Mg, Zn, B, Al, Ga, Si, Ge, Sn, or Pb, with aluminum and magnesium being preferred and aluminum being the most preferred.

Examples of preferred organometal compounds (c) include organomagnesium, organozinc, and organoaluminum compounds, and mixtures thereof. More preferred examples include compounds represented by the following formulae: $MgR^1{}_2$, $ZnR^1{}_2$, $MR^1{}_x R^2{}_y$, wherein $R^1$ independently each occurrence is hydride, a hydrocarbyl radical, a trihydrocarbyl silyl radical, a trihydrocarbyl germyl radical, or a trihydrocarbyl-, trihydrocarbyl silyl- or trihydrocarbyl germyl-substituted metalloid radical, $R^2$ independently is the same as $R^1$, x is 2 or 3, y is 0 or 1 and the sum of x and y is 3, and mixtures thereof. Examples of suitable hydrocarbyl moieties are those having from 1 to 20 carbon atoms in the hydrocarbyl portion thereof, such as alkyl, aryl, alkaryl, or aralkyl. Preferred radicals include methyl, ethyl, n- or i-propyl. n-, s- or t-butyl, phenyl, and benzyl. Preferred components (c) include the aluminum and magnesium compounds, and especially the aluminum compounds. Preferably, the aluminum component may be an aluminum compound of the formula $AlR^1{}_x$ wherein $R^1$ in each occurrence independently is hydride or a hydrocarbyl radical having from 1 to 20 carbon atoms, and x is 3. Suitable trihydrocarbyl aluminum compounds include trialkyl or triaryl aluminum compounds wherein each alkyl or aryl group has from 1 to 10 carbon atoms, or mixtures thereof. Preferred trialkyl aluminum compounds include trimethyl, triethyl, or tri-isobutyl aluminum.

Also provided herein is a compound which is the reaction product of (a) an ionic compound described above and (c) an organometal or metalloid compound described above wherein the metal or metalloid is selected from the Groups 1-14 of the Periodic Table of the Elements.

wherein:
- B is boron in a valence state of 3;
- Q is selected from the group consisting of hydride, dihydrocarbylamido, halide, hydrocarbyloxide, hydrocarbyl, and substituted-hydrocarbyl radicals;
- z' is an integer in a range from 1 to 4, preferably 1 or 2;
- G is a polyvalent hydrocarbon radical having r+1 valencies bonded to B and r groups $(T-M^\circ R^C{}_{x-1} X^a{}_y)$;
- q is an integer, 0 or 1, preferably 1;
- the group $(T-M^\circ R^C{}_{x-1} X^a{}_y)$ is a radical wherein T comprises O, S, NR, or PR, the O, S, N or P atom of which is bonded to $M^\circ$, wherein R is a hydrocarbyl radical, a trihydrocarbylsilyl radical, a trihydrocarbyl germyl radical or hydrogen;
- $M^\circ$ is a metal or metalloid selected from Groups 1-14 of the Periodic Table of the Elements,
- $R^C$ independently each occurrence is hydrogen or a group having from 1 to 80 nonhydrogen atoms which is hydrocarbyl, hydrocarbylsilyl, or hydrocarbylsilylhydrocarbyl;
- $X^a$ is a noninterfering group having from 1 to 100 nonhydrogen atoms which is halo-substituted hydrocarbyl, hydrocarbylamino-substituted hydrocarbyl, hydrocarbyloxy-substituted hydrocarbyl, hydrocarbylamino, di(hydrocarbyl)amino, hydrocarbyloxy or halide;
- x is a nonzero integer which may range from 1 to an integer equal to the valence of $M^\circ$;
- y is zero or a nonzero integer which may range from 1 to an integer equal to 1 less than the valence of $M^\circ$; and
- x+y equals the valence of $M^\circ$.
- r is an integer from 1 to 3, preferably 1; and
- d is 1.

In another aspect there is provided a compound which is the reaction product of (a) an ionic compound described above and (c) an organometal or metalloid compound described above wherein the metal or metalloid is selected from the Groups 1-14 of the Periodic Table of the Elements. A desirable embodiment is that where the compound corresponds to the formula wherein
- $M^\circ$ is a metal or metalloid selected from Groups 1-14 of the Periodic Table of the Elements,
- $R^C$ independently each occurrence is hydrogen or a group having from 1 to 80 nonhydrogen atoms which is hydrocarbyl, hydrocarbylsilyl, or hydrocarbylsilylhydrocarbyl;
- $X^a$ is a noninterfering group having from 1 to 100 nonhydrogen atoms which is halo-substituted hydrocarbyl, hydrocarbylamino-substituted hydrocarbyl, hydrocarbyloxy-substituted hydrocarbyl, hydrocarbylamino, di(hydrocarbyl)amino, hydrocarbyloxy or halide;
- x is a nonzero integer which may range from 1 to an integer equal to the valence of $M^\circ$;
- y is zero or a nonzero integer which may range from 1 to an integer equal to 1 less than the valence of $M^\circ$; and
- x+y equals the valence of $M^\circ$.

A suitable class of transition metal compounds useful in the present invention corresponds to the formula (V):

wherein:
- L is an anionic, delocalized, π-bonded group that is bound to M, containing up to 50 nonhydrogen atoms, optionally two L groups may be joined together forming a bridged structure, and further optionally one L may be bound to X;
- M is a metal of Group 4 of the Periodic Table of the Elements in the +2, +3 or +4 formal oxidation state;
- X is an optional, divalent substituent of up to 50 nonhydrogen atoms that together with L forms a metallocycle with M;
- X' is an optional neutral ligand base having up to 20 nonhydrogen atoms:
- X" each occurrence is a monovalent, anionic moiety having up to 40 nonhydrogen atoms, optionally, two X" groups may be covalently bound together forming a divalent dianionic moiety having both valences bound to M, or, optionally two X" groups may be covalently bound together to form a neutral, conjugated or nonconjugated diene that is π-bonded to M, or further optionally one or more X" and one or more X' groups may be bonded together thereby forming a moiety that is both covalently bound to M and coordinated thereto by means of Lewis base functionality;
- l may be 0, 1 or 2;
- m may be 0 or 1;
- n may be a number from 0 to 3;
- p may be an integer from 0 to 3; and
- the sum, l+m+p, is equal to the formal oxidation state of M, except when two X" groups together form a neutral conjugated or nonconjugated diene that is π-bonded to M, in which case the sum l+m is equal to the formal oxidation state of M.

Preferred complexes include those containing either one or two L groups. The latter complexes include those containing a bridging group linking the two L groups. Preferred bridging groups are those corresponding to the formula $(ER^*{}_2)_x$ wherein E is silicon, germanium, tin, or carbon, R* independently each occurrence is hydrogen or a group selected from silyl, hydrocarbyl, hydrocarbyloxy, and combinations thereof, said R* having up to 30 carbon or silicon atoms, and x is 1 to 8. Preferably, R* independently each occurrence is methyl, ethyl, propyl, benzyl, tert-butyl, phenyl, methoxy, ethoxy or phenoxy.

A further class of metal complexes utilized in some embodiments corresponds to the preceding formula $(V)L_lMX_mX'_nX''_p$, or a dimer thereof, wherein X is a divalent substituent of up to 50 nonhydrogen atoms that together with L forms a metallocycle with M.

Preferred divalent X substituents include groups containing up to 30 nonhydrogen atoms comprising at least one atom that is oxygen, sulfur, boron or a member of Group 14 of the Periodic Table of the Elements directly attached to the delocalized π-bonded group, and a different atom, selected from the group consisting of nitrogens phosphorus, oxygen or sulfur that is covalently bonded to M.

A preferred class of such Group 4 metal coordination complexes used according to the present invention corresponds to the formula (IV):

(IV)

wherein:
M is titanium or zirconium, preferably titanium in the +2, +3, or +4 formal oxidation state;
$R^3$ in each occurrence independently is selected from the group consisting of hydrogen, hydrocarbyl, silyl, germyl, cyano, halo, hydrocarbyloxy, dihydrocarbylamino, and combinations thereof, said $R^3$ having up to 20 nonhydrogen atoms, or adjacent $R^3$ groups together form a divalent derivative (that is, a hydrocarbadiyl, siladiyl or germadiyl group) thereby forming a fused ring system;
each X" in formula (VIII) is a hydride, halide, hydrocarbyl, hydrocarbyloxy or silyl group, said group having up to 20 nonhydrogen atoms, or two X" groups together form a neutral $C_{5-30}$ conjugated diene or a divalent derivative thereof;
Y is —O—, —S—, —NR*—, —PR*—, —NR*$_2$ or —PR*$_2$; and
Z is SiR*$_2$, CR*$_2$, SiR*$_2$SiR*$_2$, CR*$_2$CR*$_2$, CR*=CR*, CR*$_2$SiR*$_2$, or GeR*$_2$, wherein R* is as previously defined.

Accordingly, there are provided metal complexes corresponding to the formula VI:

(VI)

wherein:
M is titanium, zirconium or hafnium in the +2, +3 or +4 formal oxidation state;
R' is an aryl ligand or a halo-, silyl-, alkyl-, cycloalkyl-, dihydrocarbylamino-, hydrocarbyloxy-, or hydrocarbyleneamino-, substituted derivative thereof, said R' having, from 6 to 40 nonhydrogen atoms;
Z is a divalent moiety, or a moiety comprising one σ-bond and a neutral two electron pair able to form a coordinate-covalent bond to M, said Z comprising, boron, or a member of Group 14 of the Periodic Table of the Elements, and also comprising nitrogen, phosphorus, sulfur or oxygen;
X is a monovalent anionic ligand group having up to 60 atoms exclusive of the class of ligands that are cyclic, delocalized, π-bound ligand groups;
X' independently each occurrence is a neutral Lewis base ligating compound having up to 20 atoms;
X" is a divalent anionic ligand group having up to 60 atoms;
p may be zero, 1, 2, or 3;
q may be zero, 1 or 2; and
r may be zero or 1.

Specific examples of some of the transition metal compounds of the types described above, especially constrained geometry metal complexes and methods for their preparation, are disclosed in U.S. Pat. Nos. 5,721,185; 5,374,696; 5,055,438; 5,057,475; 5,096,867; 5,064,802; 5,132,380; 5,919,983; 5,783,512; and PCT Publications WO-96/28480, WO-97/15583, WO-97/35893: WO1997/044371; WO1997/043323; WO1998/006727; and WO1998/006728. Also to be found therein are teachings related to various olefin polymerization processes and the products produced in those processes which are relevant to the processes described herein.

Suitable support materials (d), also referred to as carriers or carrier materials, which may optionally be used in the present invention include those support materials which are typically used in the art of supported catalysts, and more in particular the art of supported olefin addition polymerization supported catalysts. Examples include porous resinous materials, for example, polyolefins such as polyethylenes and polypropylenes or copolymers of styrene-divinylbenzene, and solid inorganic oxides including oxides of Group 2, 3, 4, 13, or 14 metals, such as silica, alumina, magnesium oxide, titanium oxide, thorium oxide, as well as mixed oxides of silica. Suitable mixed oxides of silica include those of silica and one or more Group 2 or 13 metal oxides, such as silica-magnesia or silica-alumina mixed oxides. Silica, alumina, and mixed oxides of silica and one or more Group 2 or, 13 metal oxides are preferred support materials. Preferred examples of such mixed oxides are the silica-aluminas. The most preferred support material is silica. The shape of the silica particles is not critical and the silica may be in granular, spherical, agglomerated, fumed or other form.

Support materials suitable for the present invention preferably have a surface area as determined by nitrogen porosimetry using the B.E.T. method from about 10 to about 1000 m$^2$/g, and preferably from about 100 to about 600 m$^2$/g. The pore volume of the support, as determined by nitrogen adsorption, is typically up to about 5 cm$^3$/g, advantageously between about 0.1 and about 3 cm$^3$/g, preferably from about 0.2 to about 2 cm$^3$/g. The average particle size is not critical but typically is from about 0.5 to about 500 µm, preferably from about 1 to about 200 µm, more preferably to about 100 µm.

Preferred supports for use in the present invention include highly porous silicas, aluminas, aluminosilicates, and mixtures thereof. The most preferred support material is silica.

The support material may be in granular, agglomerated, pelletized, or any other physical form. Suitable materials include, but are not limited to, silicas available from Grace Davison (division of W. R. Grace & Co.) under the designations SD 3216.30, Davison Syloid®245, Davison 948, Davison 952, and Davison 955 and from Crosfield under the designation ES70, and from Degussa AG under the designation Acrosil®812; and aluminas available from Akzo Chemicals Inc. under the designation Ketzen® Grade B.

The support material may be subjected to a heat treatment and/or chemical treatment to reduce the water content or the hydroxyl content of the support material. Both dehydrated support materials and support materials containing small amounts of water can be used. Typically, chemical dehydration or dehydroxylation agents are reactive metal hydrides, alkyls and halides such as aluminum alkyls, alkyl silicon halides and the like. Prior to its use, the support material can be subjected to a thermal treatment at 100° C. to 1000° C., preferably at about 200° C. to about 850° C. in an inert atmosphere or dry air or under reduced pressure. Typically, this treatment is carried out for about 10 minutes to about 72 hours, preferably from about 0.5 hours to 24 hours.

The support material optionally thermally treated, may preferably be combined with a further organometal metalloid compound, more preferably an organoaluminum compound, most preferably a trialkylaluminum compound in a suitable diluent or solvent, preferably one in which the organometal compound is soluble. Typical solvents are hydrocarbon solvents having from 5 to 12 carbon atoms, preferably aromatic solvents such as toluene and xylenes, or aliphatic solvents of 6 to 10 carbon atoms, such as hexane, heptane, octane, nonane, decane, and isomers thereof, cycloaliphatic solvents of 6 to 12 carbon atoms such as cyclohexane, or mixtures of any of these.

The support material is combined with the organometal compound at a temperature of −20° C. to 150° C., preferably at about 20° C. to about 100° C. The contact time is not critical and can vary from about 5 minutes to about 72 hours, and is preferably from about 0.5 hours to about 36 hours. Agitation is preferably applied.

The pretreated support material is preferably recovered prior to its further use.

Pretreated support material do not contain the tethering groups, such as, for example, surface hydroxyl groups, which are typically found in various support materials, especially silicas and silica containing support materials. Pretreated support materials may contain terminal residues of a material used for pretreatment, such as, for example, an alumoxane residue or the residue of a trialkylaluminum compound, such as —AlR2. Certain of these residues, in particular an alumoxane residue or the residue of a trialkylaluminum compound, are capable of reacting with the moiety having an active hydrogen of the anion (a)(2) of the ionic compound. However, if a pretreated silica is used in a process, and at some point in the process a compound which is the reaction product of (a) an ionic compound and (c) an organometal or metalloid compound, or a substantially inactive catalyst precursor are brought into contact, reaction to form a covalent bond with tethering to the support is not possible, since all potentially reactive groups which could enter into a reaction resulting in tethering have been blocked or capped.

In various aspects of this invention where a support material is employed, including catalyst components and catalysts, as well as corresponding aspects which are nonsupported, whether as homogeneous solutions, solids or dispersions, an alternative expression of each of those aspects is one that is essentially free of alumoxane.

The supported catalyst may generally include a hydroxyphenyl borate (e.g., HPB, [bis(hydrogenated tallow alkyl) methylammonium][(4-hydroxyphenyl)tris(pentafluorophenyl)borate]) which includes an active hydrogen that is reacted with an organometal compound (c), such as an aluminum trialkyl, generating a toluene soluble alkyl elimination product, e.g., a dialkyl aluminum capped phenoxyborate species. An incipient absorption may be utilized to fill the silica pores with a toluene solution of the dialkyl aluminum capped phenoxyborate which is then precipitated out within the silica pores by the addition of excess non-solvent, e.g., hexane, in which the dialkyl aluminum capped phenoxyborate is insoluble. Addition of a hydrocarbon solution of the metallocene to the above slurry may generate the active supported metallocene which can be isolated via filtration. Alternatively, the catalyst may be prepared by sequential incipient absorption of the dialkyl aluminum capped phenoxyborate followed by the metallocene.

A polymerization process may be described according to one embodiment. The process may be used in any desired environment, and preferably may be carried out in a gas-phase reactor system, for example in a gas-phase reactor system 100 as shown in FIG. 1.

The polymerization process includes contacting a metallocene-based catalyst system comprising a supported constrained geometry catalyst (sCGC), at least one monomer, and an additive selected from a group consisting of: aluminum distearate; an ethoxylated amine; a mixture of a polysulfone copolymer, a polymeric polyamine, and oil-soluble sulfonic acid in a carrier fluid including a light hydrocarbon; polyethylenimines having the general formula —($CH_2$—$CH_2$—$NH$)$_n$—, where n is from about 10 to about 10,000; and a mixture thereof, in a gas-phase reactor system under polymerization conditions for creating a polymer product.

In some embodiments, the additive may be present in the reactor system at between about 1 parts per million weight (ppmw) and about 50 ppmw, or in the range of 5 ppmw to 50 ppmwo, or in the range of 5 ppmw and 25 ppmw, between about 5 ppmw and about 20 ppmw, based on a production rate of the polymer product. Alternatively, the additive may be present between about 10 ppmw and about 50 ppmw, alternatively between about 10 ppmw and about 30 ppmw.

According to some embodiments, the additive may be an aluminum distearate. In some further approaches, the aluminum distearate may be premixed with the catalyst system prior to addition of the catalyst system to the reactor system. Also, in some approaches, the aluminum distearate may be added to the reactor system separately from the catalyst system.

The additive may comprise an ethoxylated amine, such as one or more of those shown in Table 1. In some further approaches, the ethoxylated amine may be premixed with the catalyst system prior to addition of the catalyst system to the reactor system. Also, in some approaches, the ethoxylated amine may be added to the reactor system separately from the catalyst system. Furthermore, in some approaches, the ethoxylated amine may be ethoxylated stearyl amine such as IRGASTAT AS-990, sold by Huntsman International LLC, 10003 Woodloch Forest Drive, The Woodlands, Tex. 77380 (formerly Ciba Specialty Chemicals).

TABLE 1

Ethoxylated Amine Properties

| ETHOXYLATED AMINE | % TERTIARY AMINE | AMINE VALUE | COLOR, GARDNER | TYPICAL TERTIARY AMINE CONTENT | SpG (25° C.) | COMBINING WEIGHT |
|---|---|---|---|---|---|---|
| E-14-2 bis-(2-hydroxyethyl) isodecyloxypropylamine | 95 min. | 175-187 | 9 max. | 97% | 0.94 | 310 |
| E-14-5 poly (5) oxyethylene isodecyloxypropylamine | — | 123-129 | 11 max. | 100% | 0.99 | 445 |
| E-17-2 bis-(2-hydroxyethyl) isotridecyloxypropylamine | 95 min. | 155-170 | 9 max. | 97% | 0.94 | 345 |
| E-17-5 poly (5) oxyethylene isotridecyloxypropyl amine | — | 112-120 | 11 max. | 100% | 0.99 | 485 |
| E-19-2 bis-(2-hydroxyethyl) linear alkyloxypropylamine | 95 min. | — | 6 max. | 97% | 0.99 | 355 |
| E-S-2 bis (2-hydroxyethyl) soya amine | 95 min. | 150-165 | 17 max. | 97% | 0.95 | 374 |
| E-S-15 poly (15) oxyethylene soya amine | — | 57-63 | 17 max. | 100% | 1.03 | 925 |
| E-18-2 bis (2-hydroxyethyl) octadecylamine | 95 min. | 153-163 | 15 max. | 100% | 0.95 | 360 |
| E-18-5 poly (5) oxyethylene octadecylamine | — | 112-117 | 15 max. | 100% | 0.97 | 490 |
| E-18-8 poly (8) oxyethylene octadecylamine | — | 89-94 | 15 max. | 100% | 1.01 | 610 |
| E-18-10 poly (10) oxyethylene octadecylamine | — | 77-82 | 15 max. | 100% | 1.02 | 710 |
| E-18-15 poly (15) oxyethylene octadecylamine | — | 58-63 | 15 max. | 100% | 1.04 | 930 |
| E-22-2 bis (2-hydroxyethyl) octadecyloxypropylamine | 98 min. | 120-135 | 12 max. | 98% | 0.88 (140° F.) | 450 |
| E-T-2 bis-(2-hydroxyethyl) tallow amine | 95 min. | 156-164 | 16 max. | 97% | 0.91 | 360 |
| E-T-5 poly (5) oxyethylene tallow amine | — | 112-120 | 16 max. | 100% | 0.95 | 485 |
| E-T-15 poly (15) oxyethylene tallow amine | — | 59-63 | 16 max. | 100% | 1.02 | 925 |
| E-DT-3 poly (3) oxyethylene 1,3 diaminopropane | 95 min. | 230-245 | 17 max. | 97% | 0.95 | 240 |
| E-C-2 bis (2-hydroxyethyl) coco amine | 95 min. | 187-198 | 9 max. | 97% | 0.95 | 291 |

In even more approaches, the additive may be the mixture of the aluminum distearate and the ethoxylated amine. The mixture may be in a range of about 80:20 to about 20:80, or 70:30 to 30:70, or 60:40 to 40:60, aluminum distearate to ethoxylated amine. In some further approaches, the mixture may be premixed with the catalyst system prior to addition of the catalyst system to the reactor system. In other approaches, the mixture may be added to the reactor system separately from the catalyst system.

According to another embodiment, a metallocene-based catalyst system includes a supported constrained geometry metallocene catalyst (sCGC) and an additive selected from a group consisting of an aluminum distearate, an ethoxylated amine, and a mixture of aluminum distearate and ethoxylated amine.

In some approaches, the metallocene-based catalyst system includes an additive that may be aluminum distearate. In further approaches, the aluminum distearate may be premixed with the catalyst system prior to addition of the catalyst system to the reactor system. In addition, in some approaches, the aluminum distearate may be added to the reactor system separately from the catalyst system.

In more approaches, the metallocene-based catalyst system includes an additive that may be ethoxylated amine. In further approaches, the ethoxylated amine may be premixed with the catalyst system prior to addition of the catalyst system to the reactor system. In addition, the ethoxylated amine may be added to the reactor system separately from the catalyst system in some other approaches. Also, according to some approaches, the ethoxylated amine may be ethoxylated stearyl amine such as IRGASTAT AS-990, sold by Huntsman International LLC, 10003 Woodloch Forest Drive, The Woodlands, Tex. 77380 (formerly Ciba Specialty Chemicals).

In some embodiments, the additive may be the mixture of aluminum distearate and ethoxylated amine. The mixture can be in the range of about 80:20 to about 20:80 aluminum distearate to ethoxylated amine.

The additive useful herein may include an additive, suitable for use in the production of polymers for food contact applications and end products, include a mixture of a polysulfone copolymer, a polymeric polyamine, and oil-soluble sulfonic acid, in a carrier fluid (solvent) including a light hydrocarbon, such as pentane, hexane, or heptane, including the various isomers of each. Other compounds used in the carrier fluid may include various oils, such as those approved for food contact. In some embodiments, the polyamine may be derived from a vegetable amine. An example of such an additive is STATSAFE (available under the developmental name of EXPINN 10) available from INNOSPEC, Inc. This additive is a mixture of a polysulphone copolymer, a polymeric polyamine derived from a vegetable amine, and dinonylnaphthylsulphonic acid as a solution in heptane, and a high boiling point food grade oil, where the solvents include less than 0.1 wt. % toluene and other aromatic compounds, less than 0.1 wt. % isopropanol, and less than 0.1 wt. % methanol. As formulated above, continuity additive according to embodiments disclosed herein may be diluted in, for example, mineral oil or a light hydrocarbon, such as isopentane, prior to being fed to a polymerization reactor.

The additive may include polyethylenimines having the following general formula:

where n may be from about 10 to about 10,000. The polyethylenimines may be linear, branched, or hyperbranched (i.e., forming dendritic or arborescent polymer structures). An example of such an additive is LUPASOL FG, a low molecular weight (800 Daltons) ethylenimine copolymer available from BASF Corporation or LUPASOL WF, a medium molecular weight (25000 Daltons) ethylenimine copolymer also available from BASF Corporation, having a sales office at 100 Campus Drive, Florham Park, N.J. 07932.

EXAMPLES

The following examples are put forth so as to provide those skilled in the art with a complete disclosure and description and are not intended to limit the scope of that which the inventors regard as their invention.

The polymerization reactions described in the following examples were conducted in a continuous pilot-scale gas phase fluidized bed reactor of 0.35 meters internal diameter and 2.3 meters in bed height. The fluidized bed was made up of polymer granules. The gaseous feed streams of ethylene and hydrogen together with liquid comonomer were introduced below the reactor bed into the recycle gas line. Hexene was used as comonomer. The individual flow rates of ethylene, hydrogen and comonomer were controlled to maintain fixed composition targets. The ethylene concentration was controlled to maintain a constant ethylene partial pressure. The hydrogen was controlled to maintain constant hydrogen to ethylene molar ratio. The concentrations of all the gases were measured by an on-line gas chromatograph to ensure relatively constant composition in the recycle gas stream.

One illustrative catalyst described herein is a supported constrained geometry metallocene catalyst (sCGC), comprising an ionic compound (a), transition metal compound (b), organometal compound (c), and a support material (d). According to the example, this catalyst system comprises an ionic compound (a) which is hydroxyphenyl borate (HPB, [bis(hydrogenated tallow alkyl)methylammonium][(4-hydroxyphenyl)tris(pentafluorophenyl)borate]) which contains an active hydrogen that is reacted with an organometal compound (c) such as triethylaluminum, generating a toluene soluble dialkyl aluminum capped phenoxyborate species. An incipient absorption is then utilized to fill the pores of a support material (d) such as silica with a toluene solution of the dialkyl aluminum capped phenoxyborate species which is then precipitated out within the silica pores by the addition of excess hexane. Finally, addition of a hydrocarbon solution of the transition metal compound (b), such as the constrained geometry metallocene catalyst [(tert-butylamido)(dimethyl)(tetramethyl-$\eta^5$-cyclopentadienyl)silane]titanium($\eta^4$-1,3-pentadiene) [hereinafter $(C_5Me_4SiMe_2N^tBu)Ti(\eta^4$-1,3-pentadiene)], to the above slurry generates the active supported metallocene which can be isolated by filtration. Alternatively, the catalyst can be prepared by sequential incipient absorption of the dialkyl aluminum capped phenoxyborate species followed by the metallocene.

The continuity additive used in the examples is a mixture of aluminum distearate and an ethoxylated amine type compound (IRGASTAT AS-990, available from Huntsman (formerly Ciba Specialty Chemicals), referred to as a continuity additive mixture or CA-mixture.

The sCGC catalyst was injected directly into the fluidized bed using purified nitrogen as a carrier. The catalyst feed rate was adjusted to maintain a constant production rate. The reacting bed of growing polymer particles was maintained in a fluidized state by the continuous flow of the make up raw material feed and recycle gas through the reaction zone. The reactor was operated at a superficial gas velocity of 0.6-0.9 meters/sec. total pressure of 2240 kPa and at a constant reaction temperature of 80 to 85° C. The fluidized bed was maintained at a constant height by withdrawing a portion of the bed at a rate equal to the rate of formation of particulate product. The rate of product formation (the polymer production rate) was in the range of 10-15 kg/hour. The product was removed semi-continuously via a series of valves into a fixed volume chamber. This product was purged to remove entrained hydrocarbons and treated with a humidified nitrogen to deactivate any trace quantities of residual catalyst.

Example 1

In one example, a supported metallocene catalyst which is based on a constrained geometry metallocene $[(C_5Me_4SiMe_2N^tBu)Ti(\eta^4$-1,3-pentadiene)] used in conjunction with discrete borate activators, as substantially described in the teachings of U.S. Pat. No. 5,783,512, was prepared according to the following procedure.

To a one gallon mix tank was charged 0.92 kg of Davison 955 silica (available from W. R. Grace & Co.—Conn., 7237 East Gage Ave., Los Angeles, Calif. 90040) that had been previously dehydrated at 200° C. 0.51 kg of dry hexane was added to the mix tank followed by the addition of 2.6 kg of a 10 wt % triethylaluminum (TEAL) solution in hexane (~2.5 mmole TEAL/g silica). The slurry was allowed to mix for about two hours before the solids were filtered off and then washed with four 1.6 kg portions of dry hexane. The recovered solids were dried under a nitrogen stream overnight affording 1.1 kg of TEAL treated silica.

Inside an inert atmosphere glovebox, 303 mL of a 0.08 M HPB solution in toluene was further diluted by the addition of 307 mL of dry toluene. To this stirred solution was slowly added 40 mL of a 10 wt % TEAL solution in hexane. This dialkyl aluminum capped phenoxyborate solution was allowed to stir overnight before being used for subsequent steps. 0.61 kg of the above TEAL treated silica was charged to a 1 gallon mix tank and the jacket temperature was set to 25° C. The agitator speed was set to 130 rpm and a 0.5 psig nitrogen pad was maintained on the reactor. The above dialkyl aluminum capped phenoxyborate solution was slowly added to the mix tank through a dip tube. After complete addition of this solution, the resulting solid was mixed at high agitator speeds for 1 hour. The solid in the mix tank was then slurried by the addition of 2.8 kg of dry hexane and the mixture was allowed to mix 10 minutes before the addition of 74 g of a 12.2 wt % $(C_5Me_4SiMe_2N^tBu)Ti(\eta^4$-1,3-pentadiene) solution in Isopar™ E (Isopar™ E, a trademark of the ExxonMobil Chemical Company, is a mixture of $C_8$ saturated hydrocarbons) to the slurry. The slurry was allowed to mix for 2 hours before the solids were filtered off. The recovered solids were then washed with four 1.6 kg portions of dry hexane before being dried overnight under a nitrogen stream.

Example 2

Figure 2:
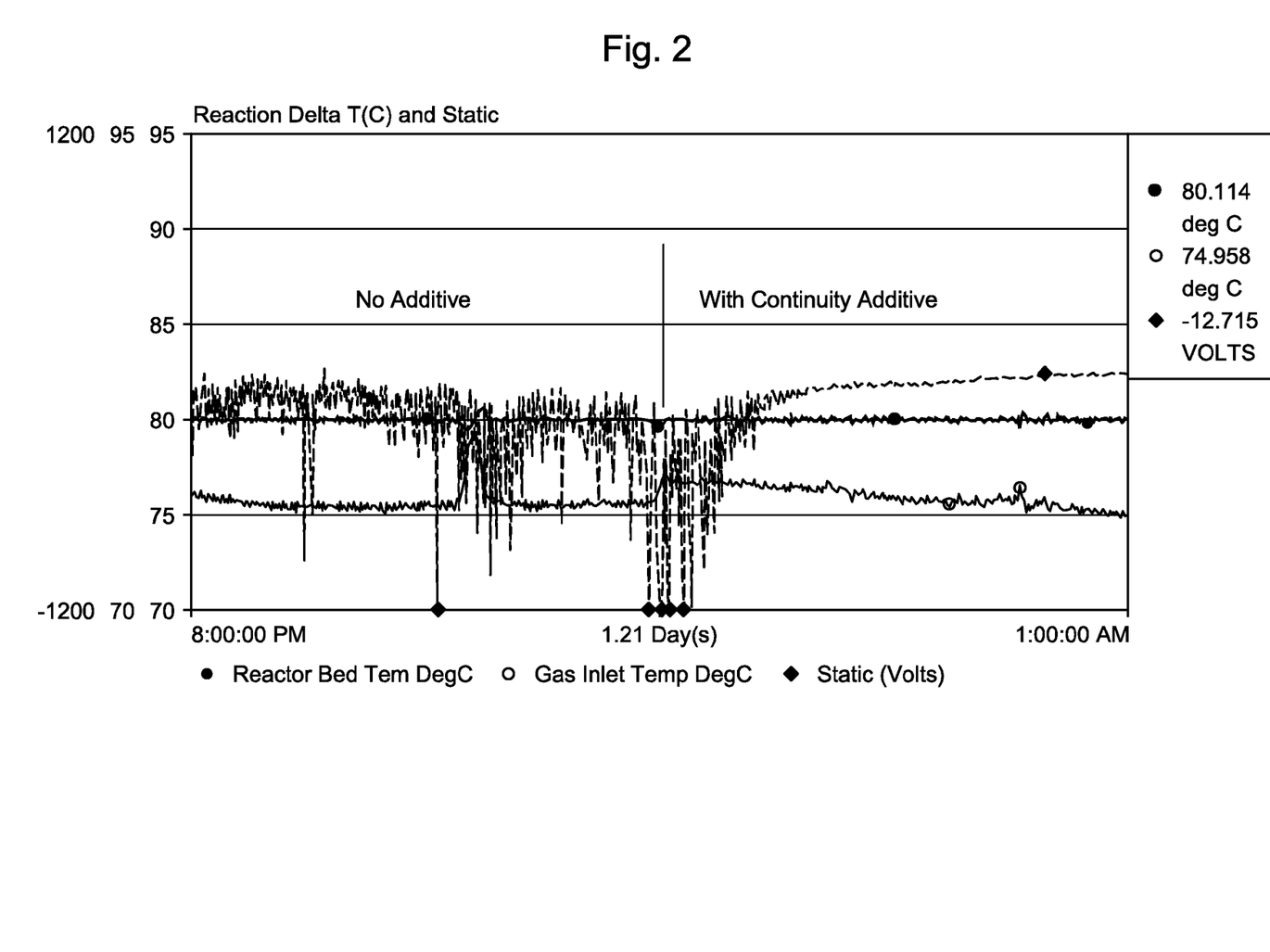
FIG. 2 shows a plot of static activity during sCGC operation in a gas-phase pilot plant run with and without the CA-mixture.

A test was carried out in the above mentioned polymerization reactor using the above mentioned sCGC catalyst without any continuity additive. The reactor was operated to produce a film product of about 1.0 to 1.2 melt index and 0.918-0.919 density at the following reaction conditions using this sCGC catalyst: reaction temperature of 80° C., ethylene concentration of 44.7 mole percent, hexene-to-ethylene molar ratio of 0.0037 and H2 concentration of 1096 ppm. The static level as measured by a static probe inserted in the bed showed increased activity and began to spike with negative polarity that was in excess of 1200 volts, a precursor for polymer adhering to the reactor and initiating of sheet formation as shown in FIG. 2.

Example 3

In this test, the reactor was operated at similar conditions as those mentioned in Example 2 above, except for use of continuity additive. The continuity additive mentioned above (a mixture of aluminum distearate and an ethoxylated amine type compound (IRGASTAT AS-990)) referred to as a CA-mixture feed was initiated to the reactor while running with sCGC catalyst. CA-mixture was fed to the reactor at a concentration of 13.2 ppmw based on production rate. A narrowing in static level band was observed and the negative spiking of the static readings disappeared within 2 hours of initiating CA-mixture co-feed to the reactor as shown in FIG. 2. The reactor operated smoothly with no sheeting or agglomeration.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited.

All documents cited herein are fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A polymerization process, comprising:
   contacting in a gas-phase reactor system under polymerization conditions for making a polymer product:
   a metallocene-based catalyst system comprising a supported constrained geometry catalyst, wherein the supported constrained geometry metallocene catalyst includes a borate anion;
   at least one monomer; and
   an additive wherein the additive comprises a mixture of aluminum distearate and ethoxylated amine, wherein the additive is added to the reactor system separately from the catalyst system, and wherein the additive is present in the reactor system at between about 5 and about 20 parts per million weight (ppmw);
   wherein the carrier fluid comprises less than 0.1 wt % toluene and other aromatic compounds, less than 0.1 wt % isopropanol and less than 0.1 wt % methanol.

2. A metallocene-based catalyst system, comprising:
   a supported constrained geometry metallocene catalyst, wherein the supported constrained geometry metallocene catalyst includes a borate anion; and
   an additive wherein the additive is a mixture of aluminum distearate and ethoxylated amine, wherein the additive is added to the reactor system separately from the catalyst system, and wherein the additive is present in the reactor system at between about 5 and about 20 parts per million weight (ppmw);
   wherein the carrier fluid comprises less than 0.1 wt % toluene and other aromatic compounds, less than 0.1 wt % isopropanol and less than 0.1 wt % methanol.

3. The polymerization process of claim 1, wherein the ethoxylated amine is ethoxylated stearyl amine.

4. The metallocene-based catalyst system of claim 2, wherein the ethoxylated amine is ethoxylated stearyl amine.

5. The metallocene-based catalyst system of claim 2, wherein the borate anion is represented by the formula [BQ4-z'(Gq(T—H)r)z']d-, wherein:
   B is boron in a valence state of 3;
   Q is selected from the group consisting of hydride, dihydrocarbylamido, halide, hydrocarbyloxide, hydrocarbyl, and substituted-hydrocarbyl radicals;
   z' is an integer in a range from 1 to 4;
   G is a polyvalent hydrocarbon radical having r+1 valencies bonded to M' and r groups (T—H);
   q is an integer, 0 or 1;
   the group (T—H) is a radical wherein T comprises O, S, NR, or PR, the O, S, N or P atom of which is bonded to hydrogen atom H, wherein R is a hydrocarbyl radical, a trihydrocarbylsilyl radical, a trihydrocarbyl germyl radical or hydrogen;
   r is an integer from 1 to 3; and
   d is 1.

6. The metallocene-based catalyst system of claim 2, wherein the borate anion is represented by the formula [BQ4-z'(Gq(T—MoRCx-1Xay)r)z']d-, wherein:
   B is boron in a valence state of 3;
   Q is selected from the group consisting of hydride, dihydrocarbylamido, halide, hydrocarbyloxide, hydrocarbyl, and substituted-hydrocarbyl radicals;
   z' is an integer in a range from 1 to 4;
   G is a polyvalent hydrocarbon radical having r+1 valencies bonded to B and r groups (T—MoRCx-1Xay);
   q is an integer, 0 or 1;
   the group (T—MoRCx-1Xay) is a radical wherein T comprises O, S, NR, or PR, the O, S, N or P atom of which is bonded to Mo, wherein R is a hydrocarbyl radical, a trihydrocarbylsilyl radical, a trihydrocarbyl germyl radical or hydrogen;
   Mo is a metal or metalloid selected from Groups 1-14 of the Periodic Table of the Elements,
   RC independently each occurrence is hydrogen or a group having from 1 to 80 nonhydrogen atoms which is hydrocarbyl, hydrocarbylsilyl, or hydrocarbylsilylhydrocarbyl;

Xa is a noninterfering group having from 1 to 100 nonhydrogen atoms which is halo-substituted hydrocarbyl, hydrocarbylamino-substituted hydrocarbyl, hydrocarbyloxy-substituted hydrocarbyl, hydrocarbylamino, di(hydrocarbyl)amino, hydrocarbyloxy or halide;

x is a nonzero integer which may range from 1 to an integer equal to the valence of Mo;

y is zero or a nonzero integer which may range from 1 to an integer equal to 1 less than the valence of Mo; and x+y equals the valence of Mo.

r is an integer from 1 to 3; and d is 1.

7. The metallocene-based catalyst system of claim 3 or 4, wherein z' is 1 or 2, q is 1, and r is 1.

* * * * *